Sept. 14, 1954  L. V. UHRIG ET AL  2,689,144
SEAL FOR BOREHOLE THERMOMETER PISTON RODS
Filed Oct. 20, 1950
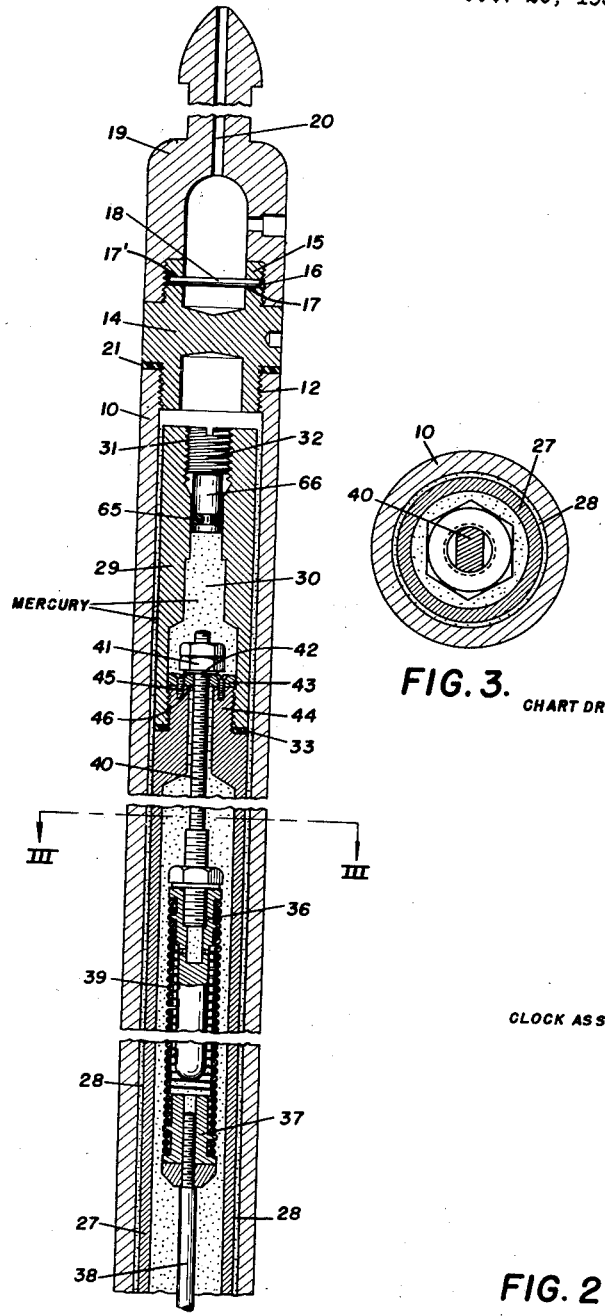
FIG. 1.
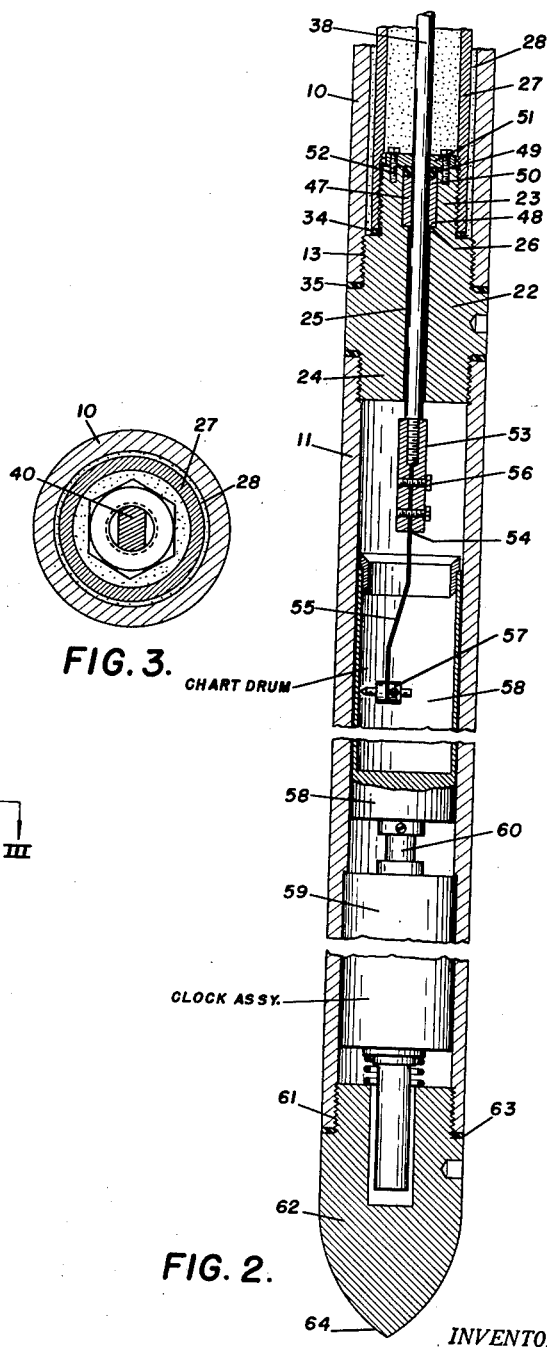
FIG. 3.
FIG. 2.
INVENTORS.
Leo V. Uhrig,
BY John N. Atkins Jr.,
ATTORNEY.

Patented Sept. 14, 1954

2,689,144

UNITED STATES PATENT OFFICE 2,689,144

SEAL FOR BOREHOLE THERMOMETER PISTON RODS

Leo V. Uhrig and John N. Atkins, Jr., Houston, Tex., assignors, by mesne assignments, to Standard Oil Development Company, Elizabeth, N. J., a corporation of Delaware Application October 20, 1950, Serial No. 191,204

1 Claim. (Cl. 286—26)

The present invention is directed to a thermometer for use in boreholes and especially adapted for the measurement of temperatures in boreholes drilled for the production of oil and gas. The thermometer disclosed herein is an improvement over that shown and described in U. S. Patent 2,183,126 to Leo V. Uhrig entitled "Borehole Thermometer."

The principal object of the present invention is the provision of a borehole thermometer of the character described which shall be rugged, simple in construction, and sensitive. A further object of the present invention is the provision of a borehole thermometer of the character described employing mercury or a similar heat sensitive fluid as a medium for indicating changes of temperature by changes in volume, and provided with means for eliminating the escape of mercury from the inner chambers thereof, and further provided with means for preventing the ingress of any fluid into the inner portions thereof.

A further object of the present invention is to provide an arrangement whereby the plug separating the measuring and recording chambers of the present invention is not subjected to wear in operation. A further object is to provide an improved sealing means around the piston rod employed in the present device at the point at which it passes through the aforementioned plug. A further object is to provide a means for adjusting the tension on the piston employed and for presetting the temperature range of the thermometer without dismantling the entire instrument.

Further objects and advantages of the present invention will appear from the following detailed description of the accompanying drawing in which Fig. 1 is a longitudinal section through the upper portion of the thermometer of the present invention;

Fig. 2 is a longitudinal section through the lower portion of said thermometer; and Fig. 3 is a section of the upper portion of said thermometer taken along the line III—III of Fig. 1.

Referring to the drawing in detail, the thermometer is made in the form of a long cylindrical bomb which has two main interior chambers, the one being housed by casing 10 and the other being housed by casing 11. The chamber housed by casing 10 will be referred to hereinafter as the piston chamber while the chamber housed by casing 11 will hereinafter be referred to as the recording chamber. Mounted within the recording chamber is a recording chart, together with the mechanism necessary to operate it. Mounted within the piston chamber is the mechanism for operating the stylus employed to record temperatures on the recording chart mounted in the recording chamber.

Casing 10 is an open-ended cylinder interiorly threaded at both ends, namely at 12 and 13. Screwed into end 12 is plug 14 provided with cup-shaped projection 15 which is exteriorly threaded at 16 and is provided with diametrically opposed slots 17 and 17' to receive a pin 18 on which may be secured a wire line for lowering the instrument into the borehole. Screwed onto the thread 16 of cup-shaped projection 15 is a cap 19 provided with a longitudinal passage 20 through which a wire line may be passed for attachment to pin 18. A gasket 21 is disposed between plug 14 and the upper threaded end 12 of casing 10, said gasket being adapted to prevent the passage of fluids between these two members.

Screwed into end 13 of casing 10 is a plug 22, said plug being provided with an exteriorly threaded stud 23 projecting into casing 10, the other end 24 of plug 22 being also exteriorly threaded. An axial passage 25 extends through plug 22 and through stud 23, that portion of the passage 25 passing through stud 23 being of greater diameter than the remainder of said passage, thus forming a shoulder 26.

Screw threaded on stud 23 is inner casing 27 of smaller external diameter than the internal diameter of casing 10, whereby an annular space 28 is provided between the two casings. Screw threadedly engaged with the upper end of casing 27 is a cap 29 having an axial passage 30 extending therethrough, the upper end 31 of said passage being screw threaded and adapted to receive screw threaded plug 32 for closing said passage. A gasket 33 is disposed between cap 29 and inner casing 27 while gasket 34 is disposed between plug 22 and inner casing 27. These gaskets provide a fluid-tight seal between the said parts. A gasket 35 is also disposed between casing 10 and plug 22 so as to prevent the movement of fluid between said parts.

Mounted in the interior of chamber 27 is a spring anchor 36 and a piston 37, a piston rod 38 being affixed to piston 37. Piston rod 38 extends through the axial passage 25 in plug 22. Anchored on spring anchor 36 and on piston 37 is a tension spring 39 which biases said members together. Spring anchor 36 is suspended within casing 27 by means of bolt 40 and nut 41, the lower edge 42 of nut 41 abutting on plate 43 secured to upper edge 44 of casing 27 by means of screws 45. The upper end of bolt 40 has two diametrically opposed flat surfaces which mate with the opening 46 in plate 43 as is best shown in Fig. 3. Therefore, when nut 41 is rotated, bolt 40 cannot rotate and thereby is caused to move vertically within casing 27. Vertical movement of bolt 40 in the aforesaid manner changes the tension on spring 39 so that any desired tension can be placed on this spring.

As previously pointed out, piston rod 38 extends through axial passage 25 of plug 22. Piston rod 38 does not fit snugly within axial passage 25 and, accordingly, a sealing arrangement is provided in the enlarged portion of said passage within stud 23. This sealing means consists of a sleeve 47 which fits loosely around piston rod 38, its lower edge 48 abutting against shoulder 26 of plug 22. The internal diameter of sleeve 47 is such that piston rod 38 does not contact the inner surface thereof when passing therethrough. An O-ring 49 also circumscribes piston rod 38 and is disposed on the upper edge 50 of sleeve 47. A retaining ring 51, which has a central opening sufficiently large so that the ring does not contact piston rod 38, circumscribes said piston rod above said O-ring and is held in place against said O-ring by means of screw 52. When screws 52 are tightened, O-ring 49 is compressed, thereby providing a fluid-tight seal around piston rod 38 and preventing the flow of heat sensitive fluid from the measuring chamber to the recording chamber.

Screw threaded on the end of piston rod 38 which projects into the recording chamber is a stud 53 provided with a recess 54 adapted to receive stylus spring 55, screws 56 securing stylus spring 55 to stud 53. A stylus 57, which is adapted to write on the surface of the record strip disposed within the interior of recording cylinder 58, is attached to the lower end of stylus spring 55.

Also disposed within casing 11 is a clock mechanism 59 including shaft 60 which mechanically connects with recording drum 58 and rotates said drum. The lower end 61 of casing 11 is closed by means of plug 62, gasket 63 being disposed between lower end 61 and plug 62. The lower end 64 of plug 62 may be bull-nosed as shown.

As shown in Fig. 1, the interior of casing 27 is completely filled with a heat sensitive fluid, such as mercury, as is the central passage 30 of plug 29 up to the threaded section 31 of said passage. This mercury filled space may be conveniently referred to as the inner chamber. It will be noted that O-ring 49 prevents passage of mercury or other heat sensitive fluid, past piston rod 38 while packing 34 and packing 33 prevent the egress of mercury past the threaded portions of casing 27. The upper threaded end 31 of passage 30 is closed by means of plug 66 carrying O-ring 65 recessed in its cylindrical surface adjacent its lower extremity, the upper end 32 of said plug being screw-threaded for engagement with the upper threaded end 31 of passage 30. With the screw-threaded end 32 of plug 66 in threaded engagement with the threaded end 31 of passage 30, O-ring 65 provides a fluid-tight seal around plug 66, thus preventing the escape of mercury through said passage. Once this seal is obtained, rotation of plug 66 in either direction causes corresponding displacement of piston 37, thus permitting the temperature range of the thermometer to be preset without dismantling the entire instrument. The range over which the thermometer may be preset will depend, of course, on the distance through which plug 66 can be moved longitudinally within passage 30.

The annular space between casing 10 and inner casing 27 and cap 29 is also filled with mercury, preferably to a point near the upper end of cap 29. It will be noted that a clearance is provided between the upper end of cap 29 and plug 14 forming a chamber which is adapted to receive the overflow of mercury from the annular space aforementioned. The purpose of the mercury in this annular space is to take up the pressure which is exerted on casing 10 by the well fluids, thereby preventing this pressure from effecting any change in the volume of the inner chamber. A further purpose of the mercury in the annular chamber is to provide good heat conductance between casing 10 and members 27 and 29.

Having fully shown and described the device of our invention, what we wish to claim and to secure by Letters Patent is:

In a borehole thermometer which includes a recording chamber and a measuring chamber longitudinally aligned with respect to each other and separated by a plug defining a longitudinally extending passage therethrough and a rod extending into said chambers through said passage, said passage being of such diameter as to permit movement of said rod therethrough without contact between said rod and said plug, a sealing means comprising a sleeve circumscribing said rod and having an edge abutting on said plug, the internal diameter of said sleeve being sufficiently large to permit said rod to move freely therethrough out of contact therewith, an O-ring circumscribing said rod and abutting against the other edge of said sleeve, a retainer ring circumscribing said rod and abutting on said O-ring, the internal diameter of said ring being sufficiently large to permit said rod to move freely therethrough out of contact therewith, said retainer ring being removably secured to said plug by screws and adapted to compress said O-ring if urged in the direction of said sleeve whereby tightening of said screws causes said O-ring to provide a fluid-tight seal between said rod and said plug.

References Cited in the file of this patent

UNITED STATES PATENTS

| Number | Name | Date |
| --- | --- | --- |
| 1,688,832 | Sartakoff | Oct. 23, 1928 |
| 1,770,559 | Taylor | July 15, 1930 |
| 2,183,126 | Uhrig | Dec. 12, 1939 |
| 2,401,379 | Smith | June 4, 1946 |
| 2,404,410 | Smith | July 23, 1946 |
| 2,518,540 | Green | Aug. 15, 1950 |

FOREIGN PATENTS

| Number | Country | Date |
| --- | --- | --- |
| 21,099 of 1904 | Great Britain | Apr. 27, 1905 |

OTHER REFERENCES

Page 101 of Product Engineering, February 1945.